US011057472B2

(12) United States Patent
Mao

(10) Patent No.: US 11,057,472 B2
(45) Date of Patent: Jul. 6, 2021

(54) FIELD DATA PROCESSING METHOD, APPARATUS, AND SYSTEM

(71) Applicant: Siemens Aktiengesellschaft, Munich (DE)

(72) Inventor: Yi Mao, Beijing (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/486,633

(22) PCT Filed: Jan. 29, 2018

(86) PCT No.: PCT/CN2018/074491
§ 371 (c)(1),
(2) Date: Aug. 16, 2019

(87) PCT Pub. No.: WO2018/149289
PCT Pub. Date: Aug. 23, 2018

(65) Prior Publication Data
US 2020/0059520 A1 Feb. 20, 2020

(30) Foreign Application Priority Data
Feb. 17, 2017 (CN) .......................... 201710086531.0

(51) Int. Cl.
H04L 29/08 (2006.01)
G06F 21/60 (2013.01)
(Continued)

(52) U.S. Cl.
CPC ............ *H04L 67/12* (2013.01); *G06F 21/606* (2013.01); *G06F 21/62* (2013.01); *G05B 19/4185* (2013.01); *G05B 2219/32404* (2013.01)

(58) Field of Classification Search
CPC ........ G05B 19/418; G06F 21/62; H04L 67/12
See application file for complete search history.

(56) References Cited

U.S. PATENT DOCUMENTS

2013/0031037 A1* 1/2013 Brandt ................ H04L 63/1416
706/12
2013/0067544 A1* 3/2013 Kwark .................... H04L 67/12
726/4
(Continued)

FOREIGN PATENT DOCUMENTS

CN 101808130 A 8/2010
CN 101937230 A 1/2011
(Continued)

OTHER PUBLICATIONS

International Search Report and Written Opinion and English translation thereof dated May 3, 2018.
(Continued)

Primary Examiner — Shean Tokuta
(74) Attorney, Agent, or Firm — Harness, Dickey & Pierce, P.L.C.

(57) ABSTRACT

The present application relates to the technical field of industrial data processing, and in particular relates to a field data processing method, apparatus and system, which are used to realize the timely processing of field data. In the embodiments of the present application, a field data processing apparatus located on an industrial site of an industrial system receives field data from at least a field apparatus on the industrial site, and processes the received field data and provides the processing result of the field data. In this way, untimely processing of field data can be avoided.

5 Claims, 5 Drawing Sheets

(51) Int. Cl.
*G06F 21/62* (2013.01)
*G05B 19/418* (2006.01)

(56) References Cited

U.S. PATENT DOCUMENTS

| | | | |
|---|---|---|---|
| 2013/0145440 A1* | 6/2013 | Adam | G06F 21/40 726/5 |
| 2015/0052619 A1* | 2/2015 | Kwak | G06F 21/6245 726/28 |
| 2015/0074749 A1* | 3/2015 | Vasko | G05B 19/4185 726/1 |
| 2015/0163210 A1* | 6/2015 | Meyers | H04W 76/10 726/4 |
| 2016/0041014 A1* | 2/2016 | Sameshima | G01D 3/10 702/127 |
| 2016/0043465 A1* | 2/2016 | McDevitt | G01S 13/74 342/368 |
| 2016/0116910 A1 | 4/2016 | Lutz et al. | |
| 2016/0333638 A1* | 11/2016 | Cascia | E06B 9/68 |
| 2016/0363919 A1 | 12/2016 | Anderson | |
| 2017/0006358 A1* | 1/2017 | Kuriyama | G05B 19/0425 |
| 2017/0180325 A1* | 6/2017 | Palermo | H04L 41/0893 |
| 2017/0192414 A1* | 7/2017 | Mukkamala | H04L 63/0823 |
| 2017/0248639 A1* | 8/2017 | Vaughn | G01R 21/006 |
| 2018/0181094 A1* | 6/2018 | Funk | H04L 12/2816 |
| 2018/0202675 A1* | 7/2018 | Park | F24F 11/54 |
| 2019/0190742 A1* | 6/2019 | Reinelt | H04L 12/2816 |
| 2019/0244455 A1* | 8/2019 | Kim | H04N 7/186 |
| 2019/0272569 A1* | 9/2019 | Kanamoto | G05B 19/418 |
| 2019/0306024 A1* | 10/2019 | Petria | H04L 67/34 |

FOREIGN PATENT DOCUMENTS

| | | |
|---|---|---|
| CN | 204203753 U | 3/2015 |
| CN | 104852973 A | 8/2015 |
| CN | 106094708 A | 11/2016 |
| CN | 106249706 A | 12/2016 |
| CN | 103716326 B | 2/2017 |
| EP | 2811354 A1 | 12/2014 |

OTHER PUBLICATIONS

PCT International Search Report and Written Opinion of International Searching Authority dated May 3, 2018 for corresponding PCT International Application No. PCT/CN2018/074491 filed Jan. 29, 2018.

Office Action for Chinese Patent Application No. 201710086531.0 dated May 27, 2020.

Office Action for European Patent Application No. 18754986.0 dated Sep. 28, 2020.

* cited by examiner

FIELD DATA PROCESSING METHOD, APPARATUS, AND SYSTEM

PRIORITY STATEMENT

This application is the national phase under 35 U.S.C. § 371 of PCT International Application No. PCT/CN2018/074491 which has an International filing date of Jan. 29, 2018, which designated the United States of America and which claims priority to Chinese Patent Application No. CN 201710086531.0 filed Feb. 17, 2017, the entire contents of which are hereby incorporated herein by reference.

FIELD

Embodiments of the present invention generally relate to the technical field of industrial data processing, and in particular relates to a field data processing method, apparatus and system.

BACKGROUND

The Supervisory Control And Data Acquisition (SCADA) system can be used for industrial control and monitoring in an industrial production. The SCADA server deployed in the central position needs to communicate with a large number of field apparatuses located on an industrial site to acquire field data. These field apparatuses can include a Programmable Logic Controller (PLC) and instruments. Field data is the data which is generated or measured by the industrial equipment in real time during the industrial production.

FIG. 1 shows the process of field data acquisition and field data processing by the SCADA server (101) in the prior SCADA system (10). The SCADA server sends a poll (Q) to a field apparatus (102), and the field apparatus replies with a response (R) containing field data (D) after receiving the poll. The Remote Terminal Unit (RTU) (103) in FIG. 1 is an apparatus installed on an industrial site to realize the communication between the field apparatus (102) and the SCADA server (101) located in the central position. The processing of field data (D) by the SCADA server (101) includes but is not limited to data storage, data analysis, alarm handling, report generation and configuration.

In the prior SCADA system, field data needs to be processed by the SCADA server deployed in the central position, field data needs to undergo the above-mentioned poll-response process and is sent by the RTU on an industrial site to the SCADA server in the central position for processing, and therefore field data is not processed in time.

SUMMARY

Embodiments of the present invention provide a field data processing method, apparatus and system to process field data in time.

In a first embodiment, a field data processing method is provided, and the method is used to process field data on an industrial site. In the method, a field data processing apparatus on the industrial site receives field data of at least a field apparatus on the industrial site, processes the field data and outputs the processing result of the field data.

In a third embodiment, an apparatus control method is provided, and the apparatus control method is executed by the server involved in the first embodiment to realize the control over the field data processing apparatus during the field data processing involved in the first embodiment. Alternatively, the control over the field apparatus or the field control apparatus can be further realized.

In a fourth embodiment, a field data sending method is provided, and the field data sending method is executed by the field apparatus involved in the first embodiment to realize the sending of field data from the field apparatus to the field data processing apparatus during the field data processing involved in the first embodiment.

In a fifth embodiment, a field data sending method is provided, and the field data sending method is executed by the field control apparatus involved in the first embodiment to realize the sending of field data from the field control apparatus to the field data processing apparatus during the field data processing involved in the first embodiment.

In a sixth embodiment, an industrial system is provided, and the industrial system comprises at least a field apparatus located on an industrial site of the industrial system and the field data processing apparatus located on the industrial site. Alternatively, the industrial system can further comprise the server involved in the first embodiment and located in the central position of the industrial system. Alternatively, the industrial system can further comprise the field control apparatus involved in the first embodiment.

In a seventh embodiment, a field data processing apparatus is provided to process field data of an industrial site, and the field data processing apparatus comprises a first receiving module used to receive field data from at least a field apparatus on the industrial site, a processing module used to process the field data, and a result output module used to output the result of the field data processed by the processing module.

In an eighth embodiment, a field data processing apparatus is provided to process field data on an industrial site, and the field data processing apparatus is an SBC and comprises a first data interface used to receive field data from at least a field apparatus on the industrial site, at least a processor used to process the field data, and a second data interface used to output the result of the field data processed by the at least a processor.

In a ninth embodiment, a server is provided, the server is located in the central position, and the server is used to control a field data processing apparatus on an industrial site and comprises a receiving module used to receive a field data acquisition permission request message from the field data processing apparatus, wherein the field data acquisition permission request message is used for the field data processing apparatus to request the right to acquire field data from at least a field apparatus on the industrial site, a processing module used for the server to determine whether the field data processing apparatus has the right to acquire the field data, and a sending module used to send a field data acquisition permission acknowledgement message to the field apparatus when the processing module determines that the field data processing apparatus has the right to acquire the field data, wherein the field data acquisition permission acknowledgement message is used to indicate that the field data processing apparatus has the right to acquire the field data.

In a tenth embodiment, a server is provided, the server is located in the central position, and the server is used to control a field data processing apparatus on an industrial site and comprises a receiver used to receive a field data acquisition permission request message from the field data processing apparatus, wherein the field data acquisition permission request message is used for the field data processing apparatus to request the right to acquire field data from at least a field apparatus on the industrial site, a processor used for the server to determine whether the field data processing apparatus has the right to acquire the field data, and a sender used to send a field data acquisition permission acknowledgement message to the field apparatus when the processing module determines that the field data processing apparatus has the right to acquire the field data, wherein the field data acquisition permission acknowledgement message is used to indicate that the field data processing apparatus has the right to acquire the field data.

In an eleventh embodiment, a field apparatus is provided, the field apparatus is located on an industrial site and comprises a first receiving module used to receive a first notification message from a server located in the central position, wherein the first notification message is used to notify the field apparatus that a field data processing apparatus with an identification on the industrial site has the right to acquire field data from the field apparatus, a processing module used to determine that the field data processing apparatus with the identification has the right to acquire the field data according to the first notification message, a second receiving module used to receive a first field data acquisition request message from the field data processing apparatus and acquire the identification of the field data processing apparatus from the first field data acquisition request message, the processing module being further used to determine that the field data processing apparatus has the right to acquire the field data according to the identification, and a second sending module used to send the field data to the field data processing apparatus.

In a twelfth embodiment, a field apparatus is provided, the field apparatus is located on an industrial site and comprises a first receiver used to receive a first notification message from a server located in the central position, wherein the first notification message is used to notify the field apparatus that a field data processing apparatus with an identification on the industrial site has the right to acquire field data from the field apparatus, a processor used to determine that the field data processing apparatus with the identification has the right to acquire the field data according to the first notification message, a second receiver used to receive a first field data acquisition request message from the field data processing apparatus and acquire the identification of the field data processing apparatus from the first field data acquisition request message, the processor being further used to determine that the field data processing apparatus has the right to acquire the field data according to the identification, and a second sender used to send the field data to the field data processing apparatus.

In a thirteenth embodiment, a field control apparatus is provided, and the field control apparatus comprises a first receiving module used to receive a second notification message from a server located in the central position, wherein the second notification message is used to notify the field control apparatus that a field data processing apparatus with an identification on the industrial site has the right to acquire field data from at least a field apparatus on the industrial site, a processing module used to determine that the field data processing apparatus with the identification has the right to acquire the field data according to the second notification message, a second receiving module used to receive a second field data acquisition request message from the field data processing apparatus and acquire the identification of the field data processing apparatus from the second field data acquisition request message, the processing module being further used to determine that the field data processing apparatus has the right to acquire the field data according to the identification, and a second sending module used to send the field data to the field data processing apparatus.

In a fourteenth embodiment, a field control apparatus is provided, and the field control apparatus comprises a first receiver used to receive a second notification message from a server located in the central position, wherein the second notification message is used to notify the field control apparatus that a field data processing apparatus with an identification on the industrial site has the right to acquire field data from at least a field apparatus on the industrial site, a processor used to determine that the field data processing apparatus with the identification has the right to acquire the field data according to the second notification message, a second receiver used to receive a second field data acquisition request message from the field data processing apparatus and acquire the identification of the field data processing apparatus from the second field data acquisition request message, the processor being further used to determine that the field data processing apparatus has the right to acquire the field data according to the identification, and a second sender used to send the field data to the field data processing apparatus.

In a fifteenth embodiment, a machine readable medium is provided, a machine readable instruction is stored on the machine readable medium and a processor executes the method provided in any of the first embodiment to the fifth embodiment or by any implementation mode in the first embodiment to the fifth embodiment when the machine readable instruction is executed by the processor.

In a sixteenth embodiment, a machine readable instruction is provided and a processor executes the method provided in any of the first embodiment to the fifth embodiment or by any implementation mode in the first embodiment to the fifth embodiment when the machine readable instruction is executed by the processor.

DESCRIPTION OF REFERENCE NUMERALS IN THE DRAWINGS

Figure 1:
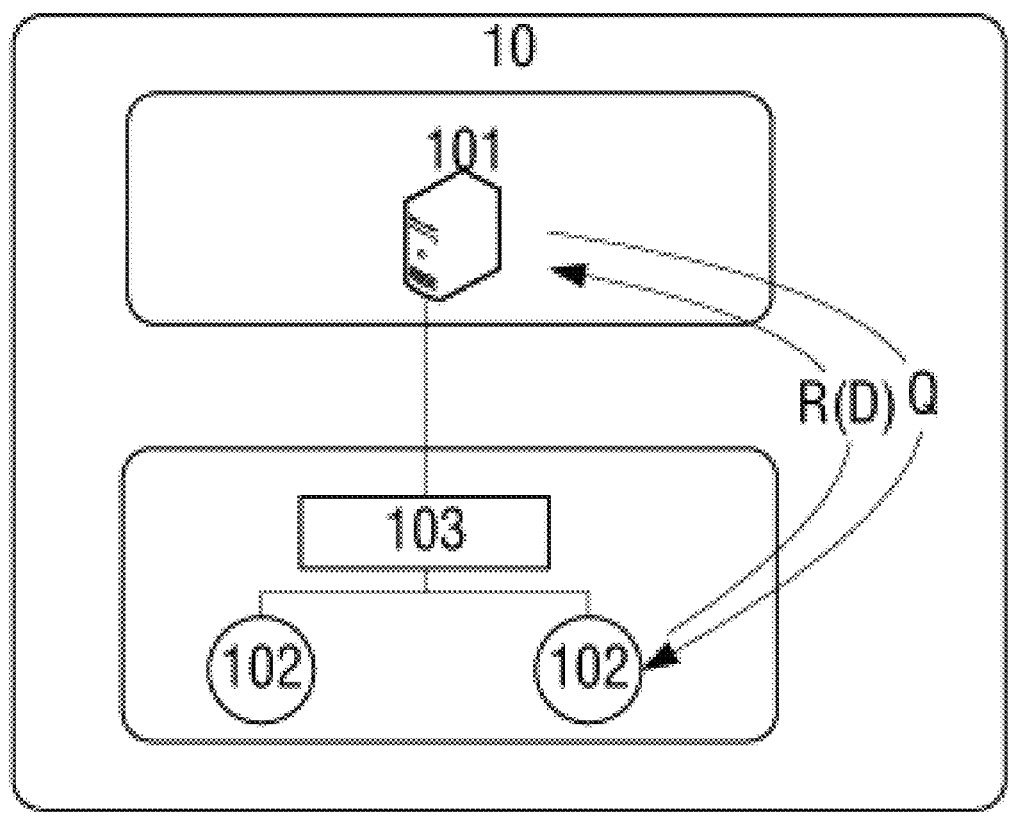
FIG. 1 shows the process of field data collection and processing by the prior SCADA system.

| | | |
|---|---|---|
| 10: SCADA system | 101: SCADA server | 102: Field apparatus |
| 103: RTU | P: Poll | R: Response |
| D: Field data | | |
| 20: Industrial system | 203: Server | 201: Field data processing apparatus |
| 202: Field apparatus | 204: Field control apparatus | |
| A: Industrial site | B: Central position | D: Field data |
| CMD: Configuration command | AUC REQ: Field data acquisition permission request message | |
| AUC RSP: Field data acquisition permission acknowledgement message | | |
| INF MSG1: First notification message | INF MSG2: Second notification message | |
| DATA REQ1: First field data acquisition request message | | |
| DATA REQ2: Second field data acquisition request message | | |
| DRV: Driver | M: Modbus | T-D: Temperature data |
| M-D: Moisture data | MV-D: Wind velocity data | |
| S: Server | CL: Computing layer | DDL: Storage and database layer |
| DAL: Data acquisition layer | | |
| 2011: First receiving module | 2012: Processing module | 2013: Result output module |
| 2014: Second receiving module | 2015: Second sending module | 2016: First sending module |
| 2017: First data interface | 2018: At least a processor | 2019: Second data interface |
| 2021: First receiving module | 2022: Processing module | 2023: Second receiving module |
| 2024: Second sending module | 2025: First receiver | 2026: Processor |
| 2027: Second receiver | 2028: Second sender | |
| 2031: Receiving module | 2032: Processing module | 2033: Sending module |
| 2034: Receiver | 2035: Processor | 2036: Sender |
| 2041: First receiving module | 2042: Processing module | 2043: Second receiving module |
| 2044: Second sending module | 2045: First receiver | 2046: Processor |
| 2047: Second receiver | 2048: Second sender | |

DETAILED DESCRIPTION OF THE EXAMPLE EMBODIMENTS

In a first embodiment, a field data processing method is provided, and the method is used to process field data on an industrial site. In the method, a field data processing apparatus on the industrial site receives field data of at least a field apparatus on the industrial site, processes the field data and outputs the processing result of the field data.

The field data processing apparatus located on the industrial site receives and processes field data, avoiding untimely field data processing caused by a long-time transmission process.

Alternatively, before the field data processing apparatus processes the field data, the field data processing apparatus receives a configuration command. Alternatively, the configuration command can come from the server located in the central position and is used to configure at least a processing function which the field data processing apparatus has to process the field data. The field data processing apparatus configures the at least a processing function according to the configuration command and executes the at least a processing function for the field data when processing field data.

In this way, the processing functions of the field data processing apparatus can be configured and the field data processing apparatus can be realized flexibly.

Alternatively, before the field data processing apparatus receives the field data, the field data processing apparatus sends a field data acquisition permission request message to the server located in the central position to request the right to acquire the field data. The server determines whether the field data processing apparatus has the right to acquire the field data. If the server determines that the field data processing apparatus has the right to acquire the field data, the server sends a field data acquisition permission acknowledgement message to the field apparatus, wherein the field data acquisition permission acknowledgement message is used to indicate that the field data processing apparatus has the right to acquire the field data. The field data processing apparatus determines that the field data processing apparatus has the right to acquire the field data according to the field data acquisition permission acknowledgement message.

In this way, secure transmission of field data can be guaranteed and illegal acquisition of field data by an unauthorized apparatus can be avoided. The server located in the central position of the industrial system authenticates the right which the field data processing apparatus has to acquire the field data.

Alternatively, when sending the field data acquisition permission request message to the server, the field data processing apparatus sends the identification of the field data processing apparatus in the field data acquisition permission request message to the server. After the server receives the field data acquisition permission request message containing the identification of the field data processing apparatus, the following two optional processing modes are available:

Mode 1: The server acquires the identification of the field data processing apparatus from the field data processing acquisition permission request message; if the server determines that the field data processing apparatus has the right to acquire the field data, the server sends a first notification message to the at least a field apparatus, wherein the first notification message is used to notify the at least a field apparatus that the field data processing apparatus with the identification has the right to acquire the field data.

Mode 2: The server acquires the identification of the field data processing apparatus from the field data processing acquisition permission request message; if the server determines that the field data processing apparatus has the right to acquire the field data, the server sends a second notification message to a field control apparatus, wherein the second notification message is used to notify the field control apparatus that the field data processing apparatus with the identification has the right to acquire the field data, wherein the field control apparatus is used to control the sending of the field data from the at least a field apparatus.

For mode 1, the field apparatus determines that the field data processing apparatus with the identification has the right to acquire the field data according to the first notification message. After receiving the field data acquisition permission acknowledgement message, the field data processing apparatus sends a first field data acquisition request message to the at least a field apparatus and incorporates the identification of the field data processing apparatus into the first field data acquisition request message. The field apparatus acquires the identification of the field data processing apparatus from the first field data acquisition request message, determines that the field data processing apparatus has the right to acquire the field data according to the identification, and sends the field data to the field data processing apparatus.

For mode 2, the field control apparatus determines that the field data processing apparatus with the identification has the right to acquire the field data according to the second notification message. After receiving the field data acquisition permission acknowledgement message, the field data processing apparatus sends a second field data acquisition request message to a field control apparatus and incorporates the identification of the field data processing apparatus into the second field data acquisition request message. The field control apparatus acquires the identification of the field data processing apparatus from the second field data acquisition request message, determines that the field data processing apparatus has the right to acquire the field data according to the identification, and sends the field data to the field data processing apparatus.

For mode 1 and mode 2, when the field data processing apparatus requests the right from the server, the field data acquisition permission request message contains the identification of the field data processing apparatus. In this way, the server can send the identification of the field data processing apparatus which has the right to acquire field data to the field apparatus providing field data or field data processing apparatus. After receiving the field data acquisition request message containing the identification of the field data processing apparatus, the apparatus providing field data determines that the field data processing apparatus has the right to acquire the field data according to the identification, and sends the field data to the field data processing apparatus. A secure field data transmission mode is provided.

Alternatively, after receiving the field data, the field data processing apparatus converts the field data based on a specific protocol of the field apparatus into field data based on an application layer protocol for processing.

After a protocol conversion, the processing of field data is more convenient.

Alternatively, the field data processing apparatus displays the processing result of the field data on the industrial site. In this way, not only can field data be processed in time on the industrial site, but also the user can acquire the processing result in real time on the industrial site.

Alternatively, the field data processing apparatus sends the processing result of the field data to the cloud. In this way, various apparatuses can all acquire the processing result of field data from the cloud.

Alternatively, the field data processing apparatus is a single board computer (SBC), wherein the first data interface on the SBC is used to receive field data, the second data interface on the SBC is used to output the processing result of the field data, and at least a processor on the SBC is used to process the field data.

The SBC realizes the portability of the field data processing apparatus and helps the user to process field data in real time on an industrial site.

In a second embodiment, a field data processing method is provided and the field data processing method is executed by the field data processing apparatus involved in the first embodiment to realize the processing of field data involved in the first embodiment.

In a third embodiment, an apparatus control method is provided, and the apparatus control method is executed by the server involved in the first embodiment to realize the control over the field data processing apparatus during the field data processing involved in the first embodiment. Alternatively, the control over the field apparatus or the field control apparatus can be further realized.

In a fourth embodiment, a field data sending method is provided, and the field data sending method is executed by the field apparatus involved in the first embodiment to realize the sending of field data from the field apparatus to the field data processing apparatus during the field data processing involved in the first embodiment.

In a fifth embodiment, a field data sending method is provided, and the field data sending method is executed by the field control apparatus involved in the first embodiment to realize the sending of field data from the field control apparatus to the field data processing apparatus during the field data processing involved in the first embodiment.

In a sixth embodiment, an industrial system is provided, and the industrial system comprises at least a field apparatus located on an industrial site of the industrial system and the field data processing apparatus located on the industrial site. Alternatively, the industrial system can further comprise the server involved in the first embodiment and located in the central position of the industrial system. Alternatively, the industrial system can further comprise the field control apparatus involved in the first embodiment.

In a seventh embodiment, a field data processing apparatus is provided to process field data of an industrial site, and the field data processing apparatus comprises a first receiving module used to receive field data from at least a field apparatus on the industrial site, a processing module used to process the field data, and a result output module used to output the result of the field data processed by the processing module.

The field data processing apparatus located on the industrial site receives and processes field data, avoiding untimely field data processing caused by a long-time transmission process.

Alternatively, the field data processing apparatus further comprises a second receiving module used to receive a configuration command before the processing module processes the field data, wherein the configuration command is used to configure at least a processing function which the field data processing apparatus has to process the field data, the processing module is further used to configure the at least a processing function according to the configuration command, and the processing module is particularly used to execute the at least a processing function for the field data when processing the field data.

In this way, the processing functions of the field data processing apparatus can be configured and the field data processing apparatus can be realized flexibly.

Alternatively, the field data processing apparatus further comprises a second sending module used to send a field data acquisition permission request message to a server located in the central position to request the right to acquire the field data before the first receiving module receives the field data, the second receiving module is further used to receive a field data acquisition permission acknowledgement message sent from the server in response to the field data acquisition permission request message, wherein the field data acquisition permission acknowledgement message is used to indicate that the field data processing apparatus has the right to acquire the field data, and the processing module is further used to determine that the field data processing apparatus has the right to acquire the field data according to the field data acquisition permission acknowledgement message.

In this way, secure transmission of field data can be guaranteed and illegal acquisition of field data by an unauthorized apparatus can be avoided. The server located in the central position of the industrial system authenticates the right which the field data processing apparatus has to acquire the field data.

Alternatively, the second sending module is particularly used to send the identification of the field data processing apparatus in the field data acquisition permission request message to the server, wherein the sever server sends a first notification message to the at least a field apparatus according to the identification of the field data processing apparatus, wherein the first notification message is used to notify the at least a field apparatus that the field data processing apparatus with the identification has the right to acquire field data, the field data processing apparatus further comprises a first sending module, which is used to send a first field data acquisition request message to the at least a field apparatus and incorporate the identification of the field data processing apparatus into the first field data acquisition request message after the second receiving module receives the field data acquisition permission acknowledgement message but before the first receiving module receives the field data, and when receiving the field data, the first receiving module is particularly used to receive the field data sent from the at least a field apparatus after the field data processing apparatus is determined to have the right to acquire the field data according to the identification.

Alternatively, the second sending module is particularly used to send the identification of the field data processing apparatus in the field data acquisition permission request message to the server, wherein the server sends a second notification message to a field control apparatus according to the identification of the field data processing apparatus, wherein the second notification message is used to notify the field control apparatus that the field data processing apparatus with the identification has the right to acquire the field data, wherein the field control apparatus is used to control the sending of the field data from the at least a field apparatus, the field data processing apparatus further comprises a first sending module, which is used to send a second field data acquisition request message to a field control apparatus and incorporate the identification of the field data processing apparatus into the second field data acquisition request message after the second receiving module receives the field data acquisition permission acknowledgement message but before the first receiving module receives the field data, and when receiving the field data, the first receiving module is particularly used to receive the field data sent after the field control apparatus determines that the field data processing apparatus has the right to acquire the field data according to the identification.

When the field data processing apparatus requests the right from the server, the field data acquisition permission request message contains the identification of the field data processing apparatus. In this way, the server can send the identification of the field data processing apparatus which has the right to acquire field data to the field apparatus providing field data or field data processing apparatus. After receiving the field data acquisition request message containing the identification of the field data processing apparatus, the apparatus providing field data determines that the field data processing apparatus has the right to acquire the field data according to the identification, and sends the field data to the field data processing apparatus. A secure field data transmission mode is provided.

Alternatively, the processing module is further used to convert the field data based on a specific protocol of the field apparatus into the field data based on an application layer protocol.

After a protocol conversion, the processing of field data is more convenient.

Alternatively, the result output module is particularly used to display the processing result of the field data on the industrial site or send the processing result of the field data to the cloud.

The field data processing apparatus displays the processing result of the field data on the industrial site. In this way, not only can field data be processed in time on the industrial site, but also the user can acquire the processing result in real time on the industrial site.

The field data processing apparatus sends the processing result of the field data to the cloud. In this way, various apparatuses can all acquire the processing result of field data from the cloud.

In an eighth embodiment, a field data processing apparatus is provided to process field data on an industrial site, and the field data processing apparatus is an SBC and comprises a first data interface used to receive field data from at least a field apparatus on the industrial site, at least a processor used to process the field data, and a second data interface used to output the result of the field data processed by the at least a processor.

The SBC realizes the portability of the field data processing apparatus and helps the user to process field data in real time on an industrial site.

In a ninth embodiment, a server is provided, the server is located in the central position, and the server is used to control a field data processing apparatus on an industrial site and comprises a receiving module used to receive a field data acquisition permission request message from the field data processing apparatus, wherein the field data acquisition permission request message is used for the field data processing apparatus to request the right to acquire field data from at least a field apparatus on the industrial site, a processing module used for the server to determine whether the field data processing apparatus has the right to acquire the field data, and a sending module used to send a field data acquisition permission acknowledgement message to the field apparatus when the processing module determines that the field data processing apparatus has the right to acquire the field data, wherein the field data acquisition permission acknowledgement message is used to indicate that the field data processing apparatus has the right to acquire the field data.

The field data processing apparatus located on the industrial site receives and processes field data, avoiding untimely field data processing caused by a long-time transmission process. Before the field data processing apparatus acquires field data, the server authenticates the field data processing apparatus, guaranteeing the secure transmission of field data and avoiding illegal acquisition of field data by an unauthorized apparatus.

Alternatively, the receiving module is particularly used to receive the field data acquisition permission request containing the identification of the field data processing apparatus and acquire the identification of the field data processing apparatus from the field data acquisition request message, and the sending module is further used to send a first notification message to the at least a field apparatus when the processing module determines that the field data processing apparatus has the right to acquire the field data, wherein the first notification message is used notify the at least a field apparatus that the field data processing apparatus with the identification has the right to acquire the field data.

Alternatively, the receiving module is particularly used to receive the field data acquisition permission request containing the identification of the field data processing apparatus and acquire the identification of the field data processing apparatus from the field data acquisition request message, and the sending module is further used to send a second notification message to a field control apparatus when the processing module determines that the field data processing apparatus has the right to acquire the field data, wherein the second notification message is used notify the field control apparatus that the field data processing apparatus with the identification has the right to acquire the field data, wherein the field control apparatus is used to control the sending of the field data from the at least a field apparatus.

When the field data processing apparatus requests the right from the server, the field data acquisition permission request message contains the identification of the field data processing apparatus. In this way, the server can send the identification of the field data processing apparatus which has the right to acquire field data to the field apparatus providing field data or field data processing apparatus. After receiving the field data acquisition request message containing the identification of the field data processing apparatus, the apparatus providing field data determines that the field data processing apparatus has the right to acquire the field data according to the identification, and sends the field data to the field data processing apparatus. A secure field data transmission mode is provided.

Alternatively, the sending module is further used to send a configuration command to the field data processing apparatus, wherein the configuration command is used to configure at least a processing function which the field data processing apparatus has to process the field data.

In this way, the processing functions of the field data processing apparatus can be configured and the field data processing apparatus can be realized flexibly.

In a tenth embodiment, a server is provided, the server is located in the central position, and the server is used to control a field data processing apparatus on an industrial site and comprises a receiver used to receive a field data acquisition permission request message from the field data processing apparatus, wherein the field data acquisition permission request message is used for the field data processing apparatus to request the right to acquire field data from at least a field apparatus on the industrial site, a processor used for the server to determine whether the field data processing apparatus has the right to acquire the field data, and a sender used to send a field data acquisition permission acknowledgement message to the field apparatus when the processing module determines that the field data processing apparatus has the right to acquire the field data, wherein the field data acquisition permission acknowledgement message is used to indicate that the field data processing apparatus has the right to acquire the field data.

The field data processing apparatus located on the industrial site receives and processes field data, avoiding untimely field data processing caused by a long-time transmission process. Before the field data processing apparatus acquires field data, the server authenticates the field data processing apparatus, guaranteeing the secure transmission of field data and avoiding illegal acquisition of field data by an unauthorized apparatus.

In an eleventh embodiment, a field apparatus is provided, the field apparatus is located on an industrial site and comprises a first receiving module used to receive a first notification message from a server located in the central position, wherein the first notification message is used to notify the field apparatus that a field data processing apparatus with an identification on the industrial site has the right to acquire field data from the field apparatus, a processing module used to determine that the field data processing apparatus with the identification has the right to acquire the field data according to the first notification message, a second receiving module used to receive a first field data acquisition request message from the field data processing apparatus and acquire the identification of the field data processing apparatus from the first field data acquisition request message, the processing module being further used to determine that the field data processing apparatus has the right to acquire the field data according to the identification, and a second sending module used to send the field data to the field data processing apparatus.

After determining that the field data processing apparatus has the right to acquire the field data according to the notification message acquired from the server and the identification of the field data processing apparatus, the field apparatus sends the field data to the field data processing apparatus, guaranteeing the secure transmission of field data. In addition, the field data is sent to the field data processing apparatus on the industrial site for processing and thus field data can be processed in time.

In a twelfth embodiment, a field apparatus is provided, the field apparatus is located on an industrial site and comprises a first receiver used to receive a first notification message from a server located in the central position, wherein the first notification message is used to notify the field apparatus that a field data processing apparatus with an identification on the industrial site has the right to acquire field data from the field apparatus, a processor used to determine that the field data processing apparatus with the identification has the right to acquire the field data according to the first notification message, a second receiver used to receive a first field data acquisition request message from the field data processing apparatus and acquire the identification of the field data processing apparatus from the first field data acquisition request message, the processor being further used to determine that the field data processing apparatus has the right to acquire the field data according to the identification, and a second sender used to send the field data to the field data processing apparatus.

After determining that the field data processing apparatus has the right to acquire the field data according to the notification message acquired from the server and the identification of the field data processing apparatus, the field apparatus sends the field data to the field data processing apparatus, guaranteeing the secure transmission of field data. In addition, the field data is sent to the field data processing apparatus on the industrial site for processing and thus field data can be processed in time.

In a thirteenth embodiment, a field control apparatus is provided, and the field control apparatus comprises a first receiving module used to receive a second notification message from a server located in the central position, wherein the second notification message is used to notify the field control apparatus that a field data processing apparatus with an identification on the industrial site has the right to acquire field data from at least a field apparatus on the industrial site, a processing module used to determine that the field data processing apparatus with the identification has the right to acquire the field data according to the second notification message, a second receiving module used to receive a second field data acquisition request message from the field data processing apparatus and acquire the identification of the field data processing apparatus from the second field data acquisition request message, the processing module being further used to determine that the field data processing apparatus has the right to acquire the field data according to the identification, and a second sending module used to send the field data to the field data processing apparatus.

After determining that the field data processing apparatus has the right to acquire the field data according to the notification message acquired from the server and the identification of the field data processing apparatus, the field control apparatus sends the field data to the field data processing apparatus, guaranteeing the secure transmission of field data. In addition, the field data is sent to the field data processing apparatus on the industrial site for processing and thus field data can be processed in time.

In a fourteenth embodiment, a field control apparatus is provided, and the field control apparatus comprises a first receiver used to receive a second notification message from a server located in the central position, wherein the second notification message is used to notify the field control apparatus that a field data processing apparatus with an identification on the industrial site has the right to acquire field data from at least a field apparatus on the industrial site, a processor used to determine that the field data processing apparatus with the identification has the right to acquire the field data according to the second notification message, a second receiver used to receive a second field data acquisition request message from the field data processing apparatus and acquire the identification of the field data processing apparatus from the second field data acquisition request message, the processor being further used to determine that the field data processing apparatus has the right to acquire the field data according to the identification, and a second sender used to send the field data to the field data processing apparatus.

After determining that the field data processing apparatus has the right to acquire the field data according to the notification message acquired from the server and the identification of the field data processing apparatus, the field control apparatus sends the field data to the field data processing apparatus, guaranteeing the secure transmission of field data. In addition, the field data is sent to the field data processing apparatus on the industrial site for processing and thus field data can be processed in time.

In a fifteenth embodiment, a machine readable medium is provided, a machine readable instruction is stored on the machine readable medium and a processor executes the method provided in any of the first embodiment to the fifth embodiment or by any implementation mode in the first embodiment to the fifth embodiment when the machine readable instruction is executed by the processor.

In a sixteenth embodiment, a machine readable instruction is provided and a processor executes the method provided in any of the first embodiment to the fifth embodiment or by any implementation mode in the first embodiment to the fifth embodiment when the machine readable instruction is executed by the processor.

In the prior SCADA system, field data needs to be processed by the SCADA server deployed in the central position, field data needs to undergo the above-mentioned poll-response process and is sent by the RTU on an industrial site to the SCADA server in the central position for processing, and therefore field data is not processed in time.

In the embodiments of the present invention, a field data processing apparatus located on an industrial site of an industrial system receives field data from at least a field apparatus on the industrial site, processes the received field data and provides the processing result of the field data. In this way, untimely field data processing caused by a transmission undergoing the above-mentioned poll-response process can be avoided.

Further, the processing functions of the field data processing apparatus can be configured and the field data processing apparatus can be realized flexibly.

Further, secure transmission of field data can be guaranteed, illegal acquisition of field data by an unauthorized apparatus can be avoided, and the server located in the central position of the industrial system authenticates the right which the field data processing apparatus has to acquire the field data.

The following describes in detail the embodiments of the present invention in combination with the drawings.

Figure 2:
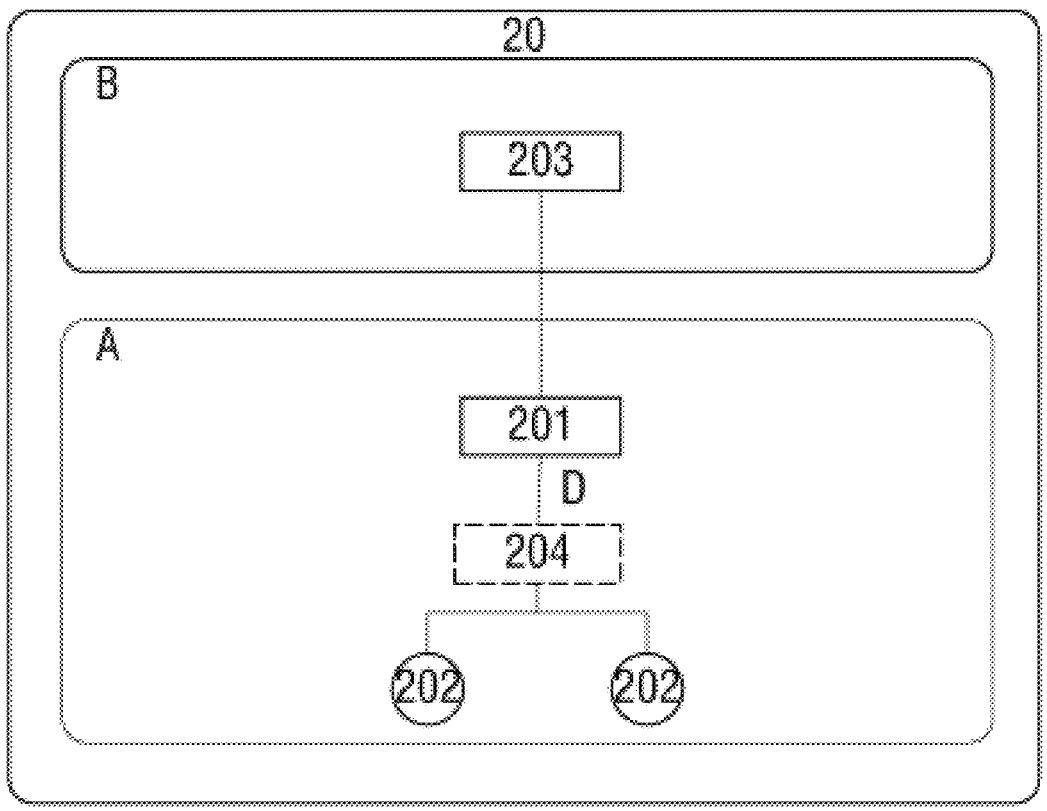
FIG. 2 shows an industrial system provided in the embodiments of the present invention.

FIG. 2 shows the structure of an industrial system (20) provided in the embodiments of the present invention.

As shown in FIG. 2, the industrial system (20) comprises at least an industrial site (A), and alternatively, the industrial system (20) can further comprise a central position (B).

Wherein, the central position (B) can comprise a server (203), and the server (203) can be used to authenticate and configure the field data processing apparatus (201) in the industrial system (20). The server (203) can be an SCADA server or an Information Technology (IT) system, for example, an Enterprise Resource Planning (ERP) system, an asset management system, a Business Intelligence (BI) system or a data analysis system.

Wherein, the industrial site (A) can comprise:

at least a field apparatus (202), with only a field apparatus (202) shown in FIG. 2 for simplicity, and a field data processing apparatus (201), used to collect field data (D) of the at least a field apparatus (202), process field data on the industrial site (A) and provide the processing result on the industrial site (A).

Wherein, the field data processing apparatus (201) can process the collected field data (D) in real time, monitor the running condition of industrial apparatuses on the industrial site (A), make statistics of field data (D), schedule the resources for production based on field data (D), generate alarm events based on field data (D), control industrial apparatuses, for example, the motion of manipulators, on the industrial site (A) in real time based on field data (D), and display the processing result of field data (D).

Alternatively, the industrial site can further comprise a field control apparatus (204), and the field control apparatus (204) can be located in the above-mentioned central position (B) or on the industrial site (A). Alternatively, the field control apparatus (204) can be an RTU shown in FIG. 1, and in this case, the field control apparatus (204) is located on the industrial site (A).

An industrial system can comprise a large number of industrial apparatuses, such as conveyor belts, manipulators and gears. Field data (D) can be temperature data, moisture data and velocity data of these industrial apparatuses. Field apparatuses (202) can include various PLCs, instruments and sensors, and are used to collect field data (D) of these industrial apparatuses.

Wherein, a field apparatus (202) can send field data to a field data processing apparatus (201) by itself. For example, the field apparatus (202) is a sensor capable of communicating and collecting field data and can send the field data (D) collected by itself to the field data processing apparatus (201). Alternatively, the field apparatus (202) can also send field data (D) to the field data processing apparatus (201) via the field control apparatus (204), and the field control apparatus (204) is capable of communicating with the field data processing apparatus (201). Alternatively, the field control apparatus (204) is further capable of collecting field data. If the field control apparatus (204) is capable of collecting field data, the field apparatus (202) itself can generate no field data, and the field control apparatus (204) collects field data (D) of the field apparatus (202) and sends the collected field data (D) to the field data processing apparatus (201). In this case, the field control apparatus (204) can be considered a part of the field apparatus (202) and is responsible for collecting and distributing field data (D) of the field apparatus (202). Of course, if a field control apparatus (204) is connected to at least two field apparatuses (202), the field control apparatus (204) can be responsible for collecting field data (D) of at least two collected field apparatuses (202) and sending the collected field data (D) to the field data processing apparatus (201).

No matter whether the field control apparatus (204) sends field data (D) or the field apparatus (202) directly sends field data (D), alternatively, information such as the identification of the field apparatus (202) which field data (D) belongs to and the type of field data (D) can be carried to help the field data processing apparatus (201) to process and display field data (D) when field data (D) is sent.

Alternatively, various apparatuses or servers in the industrial system (20) can be deployed on a public cloud or a private cloud to obtain a tailored cloud storage space and processing capability.

Alternatively, some apparatuses in the industrial system (20) are deployed on a public cloud and the other apparatuses are deployed on a private cloud. For example, the server (203) is deployed on a public cloud, and the field data processing apparatus (201), field apparatus (202) and field control apparatus (204) are deployed on a private cloud. Alternatively, the server (203) and the field data processing apparatus (201) are deployed on a public cloud, and the field apparatus (202) and field control apparatus (204) are deployed on a private cloud. The user himself does not need to maintain the apparatuses deployed on a public cloud, and the apparatuses deployed on a private cloud built by the user are more secure.

Alternatively, if the field apparatus (202) directly sends field data (D) to the field data processing apparatus (201), the field data processing apparatus (201) and the field apparatus (202) can be deployed on a public cloud or a private cloud; if the field control apparatus (204) sends field data (D) to the field data processing apparatus (201), the field data processing apparatus (201) and the field control apparatus (204) can be deployed on a public cloud or a private cloud. In this way, communication resources between apparatuses are adequate and the transmission between them is reliable so that the field data processing apparatus (201) can effectively and reliably acquire field data (D).

Alternatively, the industrial system (20) can be realized based on an open-source SCADA protocol. For example, the industrial system can be realized based on the Eclipse SCADA protocol, and in this case, the industrial system (20) can be an SCADA system realized based on the Java platform.

Figure 3:
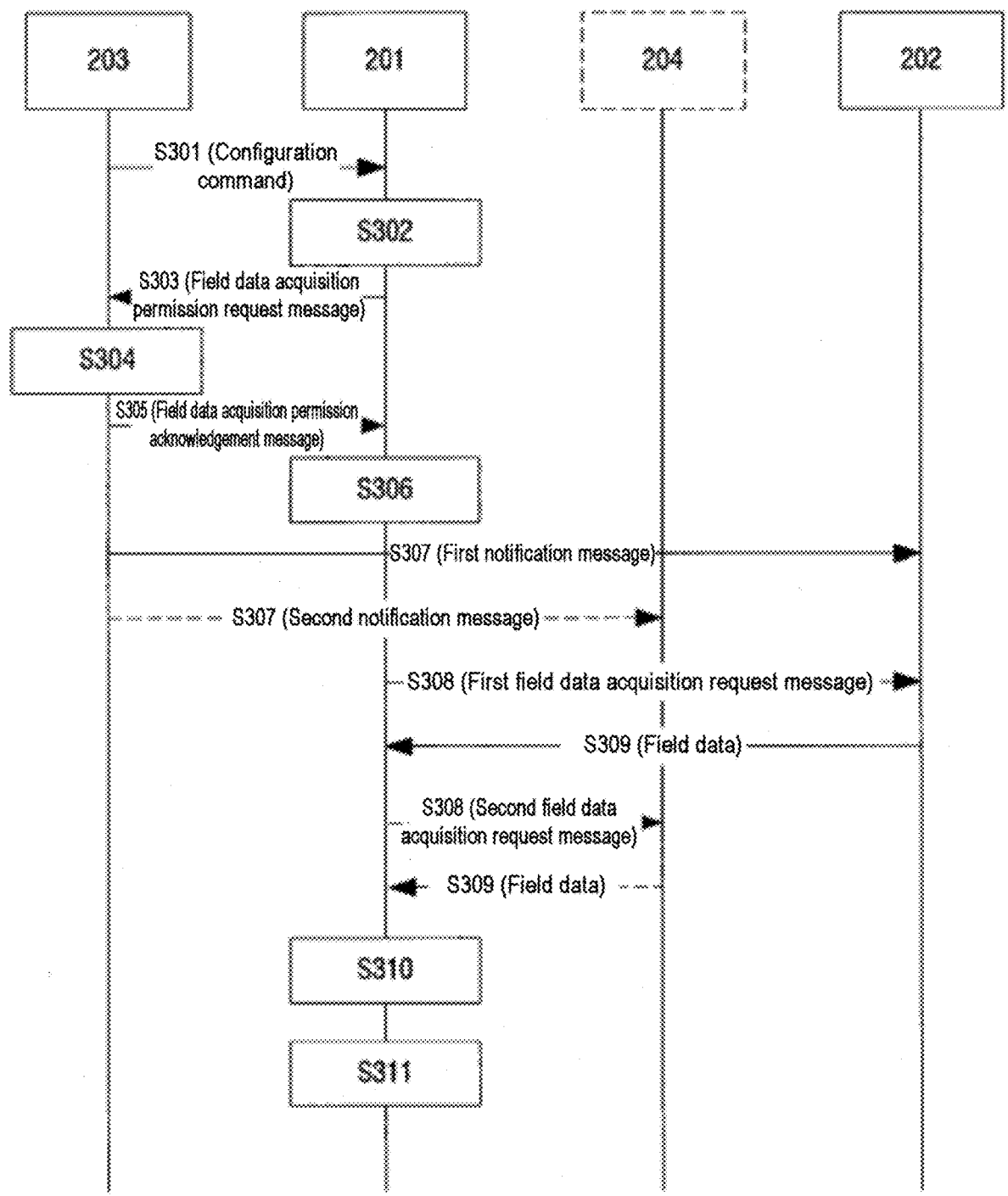
FIG. 3 shows the flow of a first field data processing method provided in the embodiments of the present invention.

For the functions of the components of the industrial system (20) and the interactions between these components, see the field data processing method shown in FIG. 3.

FIG. 3 shows the flow of a first field data processing method provided in the embodiments of the present invention. The flow shows the functions of the components of the industrial system (20) and the interactions between these components. As shown in FIG. 3, the flow can comprise the following steps:

Wherein, steps S301 and S302 are used to configure the processing function of the field data processing apparatus (201), steps S303 to S307 are used to authenticate the field data processing apparatus (201) which wants to acquire field data (D), steps S308 to S310 are used for the field data processing apparatus (201) to acquire field data (D) and process the acquired field data (D), and step S311 is used for the field data processing apparatus (201) to output the processing result of field data (D).

S301: The server (203) sends a configuration command (CMD) to the field data processing apparatus (201), wherein the configuration command (CMD) is used to configure at least a processing function which the field data processing apparatus (201) has to process the field data (D).

Wherein, the processing functions include but are not limited to the following functions:
1. monitoring of the running condition of industrial apparatuses;
2. real-time control over industrial apparatuses;
3. statistical analysis of field data (D);
4. alarm event handling based on field data (D);
5. production resource scheduling based on field data (D).

Alternatively, the configuration command (CMD) can further be used to configure the following:
1. type of the industrial apparatus which the field data (D) the field data processing apparatus (201) can acquire belongs to;
2. identification of the industrial apparatus which the field data (D) the field data processing apparatus (201) can acquire belongs to;
3. parameters of the algorithm adopted by the field data processing apparatus (201) to process field data (D);
4. parameters used by the field data processing apparatus (201) to provide the processing result of the field data (D) (for example, if the field data processing apparatus (201) displays the processing result of the field data (D) on a user interface, the configuration command (CMD) can be used to configure the size, layout and controls of the user interface).

Alternatively, all other parameters related to the processing of field data (D) and the supply of the processing result of field data (D) can be configured by use of the configuration command (CMD).

Another alternative implementation mode is that the configuration command (CMD) can also be directly sent by the operator to the field data processing apparatus (201) via the user interface provided by the field data processing apparatus (201), without any necessity of performing configurations through the server (203).

S302: The field data processing apparatus (201) receives the configuration command (CMD) and performs configurations according to the configuration command (CMD).

S303: The field data processing apparatus (201) sends a field data acquisition permission request (AUC REQ) message to the server (203) to request the right to acquire field data (D).

S304: After receiving the field data acquisition permission request (AUC REQ) message, the server (203) determines whether the field data processing apparatus (201) has the right to acquire the field data (D).

Alternatively, the server (203) can determine whether the field data processing apparatus (201) has the right to acquire field data (D) according to a data acquisition right table stored in advance. For an alternative implementation mode of the data acquisition right table, see Table 1.

TABLE 1

Data acquisition right table

| Identification of field data processing apparatus | Field data set | Field data processing function | Any right to acquire field data? |
|---|---|---|---|
| ABCD123456 | Set 1 | Statistical analysis | Yes |
| ABCD123456 | Set 1 | Production resource scheduling | No |
| ABCD123457 | Set 2 | Real-time control over industrial apparatuses | Yes |

Wherein, when the field data processing apparatus (201) sends a field data acquisition permission request (AUC REQ) message, the message can contain its own identification, the conditions to be satisfied for the acquisition of field data (D) and the processing functions the field data processing apparatus (201) needs to realize for field data (D). Wherein, the conditions to be satisfied for the acquisition of field data can be the type of the industrial apparatus which field data belongs to, and the address of the industrial site (A). After receiving the conditions, the server (203) can convert them into a set in the second column in the table above, namely, determine the set of the field data (D) which the field data processing apparatus (201) is going to acquire. The server (203) can further determine the processing functions which the field data processing apparatus (201) needs to realize for field data (D) according to the information about the processing functions in the message. For the same field data (D), if the processing functions to be realized are different, the corresponding rights will be different. For example, if the field data processing apparatus with an identification ABCD123456 in the first row or second row needs to realize the statistical analysis function, the field data processing apparatus has the right to acquire the field data (D), and if the field data processing apparatus needs to realize the production resource scheduling function, the field data processing apparatus has no right to acquire field data (D).

It should be noted that when the server (203) determines whether the field data processing apparatus (201) has the right to acquire field data (D), the optional implementation mode is not limited to those listed in Table 1, as long as the authentication of the field data processing apparatus (201) can be realized. For example, the server (203) can perform authentications only according to field data processing apparatuses (201). For example, a white list listing the identifications of the field data processing apparatuses (201) which have the right to acquire field data (D) can be set in advance. When a field data processing apparatus (201) sends a field data acquisition permission request (AUC REQ) message, the message contains its own identification, and the server (203) acquires the identification in the message and determines whether the identification is in the white list. If the identification is in the white list, the server determines that the field data processing apparatus (201) has the right to acquire field data (D), and otherwise the server determines that the field data processing apparatus (201) has no right to acquire field data (D).

S305: If the field data processing apparatus (201) has the right to acquire the field data (D), the server (203) sending a field data acquisition permission acknowledgement (AUC RSP) message to the field apparatus (202), wherein the field data acquisition permission acknowledgement (AUC RSP) message is used to indicate that the field data processing apparatus (201) has the right to acquire the field data (D).

S306: The field data processing apparatus (201) receives a field data acquisition permission acknowledgement (AUC RSP) message sent from the server (203) in response to the field data acquisition permission request (AUC REQ) message and determines the field data processing apparatus (201) has the right to acquire field data (D) according to the field data acquisition permission acknowledgement (AUC RSP) message.

Alternatively, if the server (203) determines that the field data processing apparatus (201) has no right to acquire field data (D), the server (203) can send a field data acquisition permission rejection (AUC REJ) message to the field data processing apparatus (201), wherein the message is used to indicate that the field data processing apparatus (201) has no right to acquire field data (D). Or, the server (203) sends no message to the field data processing apparatus (201), and if the field data processing apparatus (201) fails to receive a message from the server (203) in a preset period after sending the field data acquisition permission request (AUC REQ) message, the field data processing apparatus determines that it has no right to acquire field data (D).

Alternatively, in step S303, the field data processing apparatus (201) can send the identification of the field data processing apparatus (201) in the field data acquisition permission request (AUC REQ) message to the server (203). The server (203) acquires the identification of the field data processing apparatus (201) from the message. If the server (203) determines that the field data processing apparatus (201) has the right to acquire the field data (D) in step S304, the server (203) can further perform step S307. The following two optional implementation modes are available to Step S307:

Mode 1.

The server (203) sends a first notification message (INF MSG1) to the at least a field apparatus (202), wherein the first notification message (INF MSG1) is used to notify the at least a field apparatus (202) that the field data processing apparatus (201) with the identification has the right to acquire the field data (D). Mode 1 applies where the field apparatus (202) can itself send field data (D) to the field data processing apparatus (201).

Mode 2.

The server (203) sends a second notification message (INF MSG2) to a field control apparatus (204), wherein the second notification message (INF MSG2) is used to notify the field control apparatus (204) that the field data processing apparatus (201) with the identification has the right to acquire the field data (D). Mode 2 applies where the field control apparatus (204) can send field data (D) to the field data processing apparatus (201).

For mode 1 of Step S307, after receiving the first notification message (INF MSG1), the field apparatus (202) acquires and records the identification of the field data processing apparatus (201) in the message. For mode 2 of Step S307, after receiving the second notification message (INF MSG2), the field control apparatus (204) acquires and records the identification of the field data processing apparatus (201) in the message.

In the embodiments of the present invention, the steps of configuring the processing functions of the field data processing apparatus (201) can be performed before, after or together with the step of authenticating the field data processing apparatus (201).

The flow shown in FIG. 3 can further comprise the following steps:

S308: The field data processing apparatus (201) sends a field data acquisition request.

S309: The field data processing apparatus (201) receives field data (D).

Wherein, if the field apparatus (202) itself sends field data (D) to the field data processing apparatus (201), then in step S308, the field data processing apparatus (201) sends a first field data acquisition request (DATA REQ1) message to the at least a field apparatus (202) and incorporates the identification of the field data processing apparatus (201) into the first field data acquisition request (DATA REQ1) message. For this case, in step S309, after the field data (D) determines that the field data processing apparatus (201) has the right to acquire the field data (D) based on the identification, the field apparatus sends the field data (D) to the field data processing apparatus (201) and the field data processing apparatus (201) receives field data (D) from at least field apparatus (202).

Wherein, if the field control apparatus (204) sends field data (D) to the field data processing apparatus (201), then in step S308, the field data processing apparatus (201) sends a second field data acquisition request (DATA REQ2) message to a field control apparatus (204) and incorporates the identification of the field data processing apparatus (201) into the second field data acquisition request (DATA REQ2) message. For this case, in step S309, after the field control apparatus (204) determines that the field data processing apparatus (201) has the right to acquire the field data (D) based on the identification, the field control apparatus sends the field data (D) to the field data processing apparatus (201) and the field control apparatus (204) receives field data (D) from the field control apparatus (204).

S310: The field data processing apparatus (201) process the field data (D) received in step S309. Wherein, the field data processing apparatus (201) can process field data (D) according to the processing functions configured according to the configuration command (CMD) in step S301.

Alternatively, field data (D) received by the field data processing apparatus (201) is realized based on a specific protocol of the field apparatus (202), for example, based on the modbus (M) protocol. The field data processing apparatus (201) can perform a protocol conversion for the received field data (D), for example, convert the received field data into field data (D) realized based on a application layer protocol to facilitate subsequent data processing. The field data processing apparatus (201) can realize the above-mentioned protocol conversion by means of a driver (DRV).

Figure 3A:
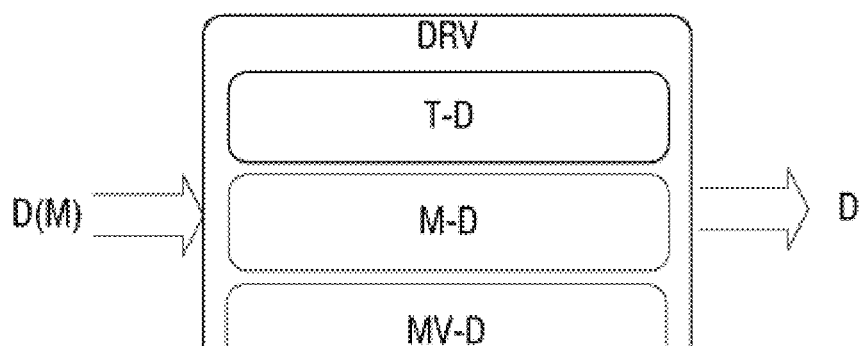
FIG. 3A shows the protocol conversion process of field data in the embodiments of the present invention.

For an example of the driver, see FIG. 3A. On the one hand, the driver receives field data (D) realized based on the modbus protocol. The field data (D) can include, for example, temperature data (T-D), moisture data (M-D) and wind velocity data (MV-D). The driver (DRV) outputs field data (D) realized based on the application layer protocol after performing a protocol conversion for the received field data (D).

Of course, the driver (DRV) can also perform a reverse protocol conversion, that is to say, convert a control command which is realized based on the application layer protocol to control the field apparatus (202) into a control command based on a specific protocol of the field apparatus (202) to control the field apparatus (202).

Figure 3B:
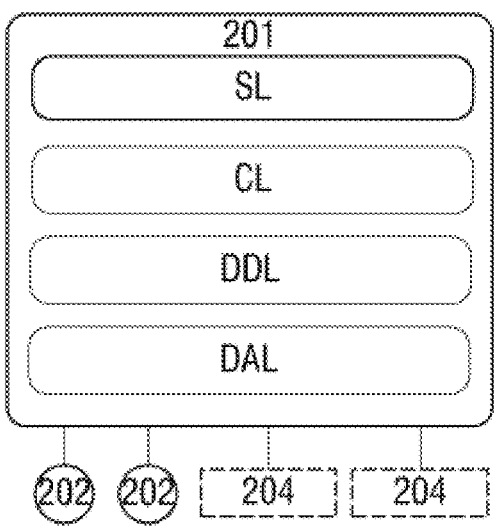
FIG. 3B shows an alternative implementation mode for data processing by the field data processing apparatus in the embodiments of the present invention.

The field data processing apparatus (201) can adopt a software protocol stack to process field data (D). FIG. 3B shows an optional implementation mode of the software protocol stack and the software protocol stack comprises from the bottom up:

1. Data Acquisition Layer (DAL), used to acquire field data (D) from the field apparatus (202) or field control apparatus (204). Wherein, the field data (D) acquired by the DAL can be field data (D) after the above-mentioned protocol conversion or before the above-mentioned protocol conversion. If the industrial system (20) is an SCADA system, the DAL can be located on the main side/server side of the SCADA system. The DAL can support the functions such as alarm event, history data and configuration. Alternatively, the above-mentioned protocol conversion can be realized by the DAL.

2. Storage and DB Layer (DDL), used to store and organize the field data (D) acquired by the DAL. The DDL can be realized based on the Hadoop Distributed File System (HDFS), MongoDB or MySQL and the DDL can be deployed on a cloud realized based on Openstack or Amazon Web Services (AWS).

3. Computing layer (CL), used to adopt a specific algorithm to process field data (D), for example, perform a big data analysis based on the Hadoop architecture and/or a streaming data analysis, wherein the streaming data analysis is more time-sensitive. Alternatively, the CL can process the field data (D) based on the processing functions configured according to the configuration command (CMD).

4. Service Layer (SL). The SL can comprise at least a node configured with applications (APPs). These APPs can comprise Web services which are used to provide the processing result of data as a service for the clients, and the APPs can further comprise visual applications which are used to realize the visualization of the processing result of field data (D).

S311: The field data processing apparatus (201) outputs the processing result of field data (D).

For example, the field data processing apparatus (201) can display the processing result of field data (D) on its own screen.

Figure 3C:
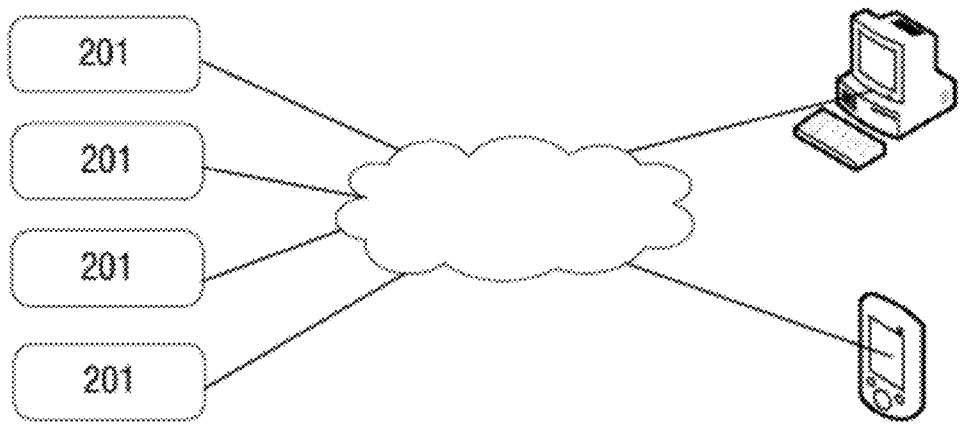
FIG. 3C shows an example of the display modes of the processing result of field data in the embodiments of the present invention.

Again for example, the field data processing apparatus (201) sends the processing result of field data (D) to the cloud. As shown in FIG. 3C, the field data processing apparatus (201) can send the processing result of field data (D) to the cloud where the server (203) is located. Authorized apparatuses can access the processing result on the cloud and display the processing result. For example, a mobile terminal access the processing result on the cloud and display the processing result on its own screen. Again for example, an operation and maintenance computer located in the central position (B) acquires the processing result on the cloud and displays the processing result on its own screen.

The field data processing apparatus (201) is connected to a cloud, for example, an industrial cloud, and the web client and the mobile client are realized on the protocol stack of the industrial cloud. In this way, the user can remotely monitor and/or control each industrial apparatus on the industrial site (A).

The field data processing apparatus (201) can be an SBC. The SBC is a complete computer realized based on a circuit board and comprises a processor, a storage and input/output interfaces, and alternatively, the SBC can further have other functions of a computer. The SBC can be used to realize a presentation system and a development system. For example, the SBC can be used to realize an education system or can be used as an embedded computer controller. Different from a desktop computer, the SBC is usually connected to peripherals independently of extension slots. A backplane can be inserted into some SBCs to realize system expansion. The SBC is characterized by portability, a low cost and low power consumption. According to the requirements for function realization, power consumption and the cost, a Raspberry Pi SBC or an Arduino SBC can be selected to realize the field data processing apparatus (201).

Figure 5:
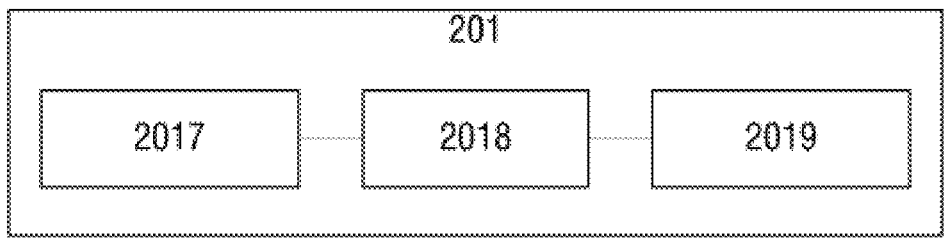
FIG. 5 shows the structure of a second field data processing apparatus provided in the embodiments of the present invention.

For an optional implementation mode of the field data processing apparatus (201) realized based on the SBC, see FIG. 5. As shown in FIG. 5, the field data processing apparatus (201) can comprise:

a first data interface (2017), used to receive field data (D), and alternatively, to send a real-time control instruction to the field apparatus (202), at least a processor (2018), used to process field data (D), and at least a storage, used to store a data handling program, at least a processor (2018) processing field data (D) by invoking the data handling program. Wherein, the above-mentioned driver (DRV) can be stored as a part of the data handling program in the at least a storage.

At least a processor (2018) can comprise at least a Central Processing Unit (CPU) or comprise at least a CPU and at least a Digital Signal Processor (DSP). The DSP can realize the algorithm of the CL in the above-mentioned software protocol stack.

The field data processing apparatus (201) further comprises a second data interface (2019), which is used to output the result of field data (D) processed by at least a processor (2018).

If the field data processing apparatus (201) displays the processing result of field data (D) on the industrial site (A), multimedia devices such as display and loudspeaker can be integrated into the field data processing apparatus (201). The multimedia device is connected to the second data interface (2019) and the processing result of field data (D) is displayed on the industrial site (A) according to the output from the second data interface (2019). For example, the data analysis result can be displayed on the display and alarm sound can be given out of the loudspeaker. In this way, site maintenance on the industrial site (A) can conveniently be realized.

Alternatively, a real-time control instruction for an industrial apparatus can be input through the second data interface (2019). For example, the control instruction input through the touch panel on the display and/or the acoustic control instruction input through a microphone is sent via the second data interface (2019) to at least a processor (2018) for processing.

If the field data processing apparatus (201) sends the processing result of field data (D) to the cloud, the second data interface (2014) can be an Ethernet port or a wireless communication module, for example, Wireless Fidelity (WiFi) module in terms of realization. The mobile terminal or operation and maintenance computer connected to the cloud can also acquire the processing result of data in real time and display the result.

Alternatively, the first data interface (2017), at least a processor (2018), at least a storage and the second data interface (2019) are connected with a bus.

Figure 4:
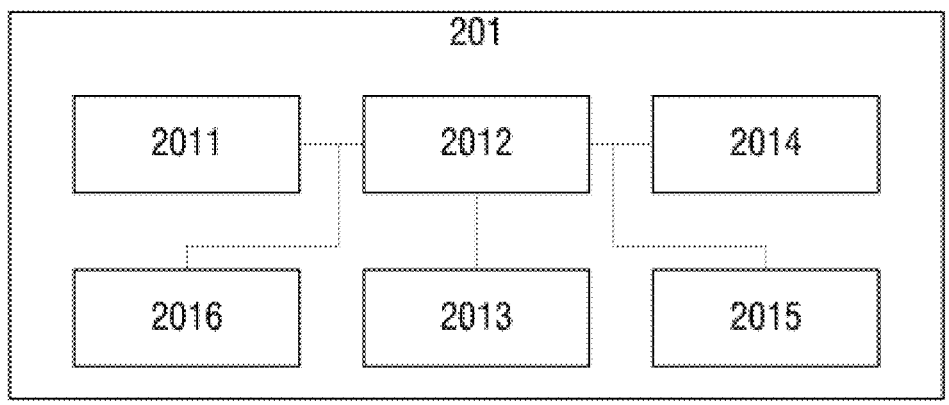
FIG. 4 shows the structure of a first field data processing apparatus provided in the embodiments of the present invention.

FIG. 4 shows the structure of a first field data processing apparatus (201) provided in the embodiments of the present invention. As shown in FIG. 4, the field data processing apparatus (201) comprises:

a first receiving module (2011), used to receive field data from at least a field apparatus (202) on the industrial site, a processing module (2012), used to process field data, and a result output module (2013), used to output the result of field data processed by the processing module (2012).

Alternatively, the field data processing apparatus (201) further comprises:

a second receiving module (2014), used to receive a configuration command before the processing module (2012) processes field data, wherein the configuration command is used to configure at least a processing function which the field data processing apparatus (201) has to process the field data, the processing module (2012) is further used to configure at least a processing function according to the configuration command, and the processing module (2012) is particularly used to execute at least a processing function for field data when processing field data.

Alternatively, the field data processing apparatus (201) further comprises:

a second sending module (2015), used to send a field data acquisition permission request message to a server (203) located in the central position to request the right to acquire field data before the first receiving module (2011) receives field data, and a second receiving module (2014), used to receive a field data acquisition permission acknowledgement message sent from the server (203) in response to the field data acquisition permission request message, wherein the field data acquisition permission acknowledgement message is used to indicate that the field data processing apparatus (201) has the right to acquire field data, the processing module (2012) is further used to determine that the field data processing apparatus (201) has the right to acquire field data according to the field data acquisition permission acknowledgement message.

Alternatively, the second sending module (2015) is particularly used to send the identification of the field data processing apparatus (201) in the field data acquisition permission request message to the server (203), wherein the server (203) sends a first notification message to at least a field apparatus (202) according to the identification of the field data processing apparatus (201), wherein the first notification message is used to notify at least a field apparatus (202) that the field data processing apparatus (201) with the identification has the right to acquire field data, the field data processing apparatus (201) further comprises a first sending module (2016), which is used to send a first field data acquisition request message to at least a field apparatus (202) and incorporate the identification of the field data processing apparatus (201) into the first field data acquisition request message after the second receiving module (2014) receives the field data acquisition permission acknowledgement message but before the first receiving module (2011) receives the field data, and when receiving field data, the first receiving module (2011) is particularly used to receive field data sent from at least a field apparatus (202) after the field data processing apparatus (201) is determined to have the right to acquire the field data according to the identification.

Alternatively, the second sending module (2015) is particularly used to send the identification of the field data processing apparatus (201) in the field data acquisition permission request message to the server (203), wherein the server (203) sends a second notification message to a field control apparatus (204) according to the identification of the field data processing apparatus, wherein the second notification message is used to notify the field control apparatus (204) that the field data processing apparatus (201) with the identification has the right to acquire field data, wherein the field control apparatus (204) is used to control the sending of field data from at least a field apparatus (202), the field data processing apparatus (201) further comprises a first sending module (2016), which is used to send a second field data acquisition request message to a field control apparatus (204) and incorporate the identification of the field data processing apparatus (201) into the second field data acquisition request message after the second receiving module (2014) the field data processing apparatus (201) receives the field data acquisition permission acknowledgement message but before the first receiving module (2011) receives field data, and when receiving field data, the first receiving module (2011) is particularly used to receive field data sent after the field control apparatus (204) determines that the field data processing apparatus (201) has the right to acquire field data according to the identification.

Alternatively, the processing module (2012) is further used to convert field data based on a specific protocol of the field apparatus into field data based on an application layer protocol.

Alternatively, the result output module (2013) is particularly used to display the processing result of field data on the industrial site or send the processing result of field data to the cloud.

For other optional implementation modes of the first field data processing apparatus (201), see the realization of the field data processing apparatus (201) in the previous embodiments. No details about other optional implementation modes will be given here.

The second field data processing apparatus (201) shown in FIG. 5 can be considered a specific implementation mode of the first field data processing apparatus (201) shown in FIG. 4. Wherein, the first receiving module (2011), processing module (2012), result output module (2013), second receiving module (2014), second sending module (2015) and first sending module (2016) can be program modules and are stored as machine readable instructions in at least a storage, and at least a processor (2018) invokes these program modules to realize the functions of these program modules.

Figure 6:
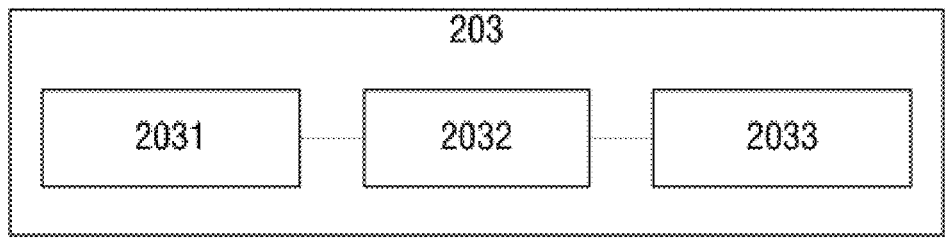
FIG. 6 shows the structure of a first server provided in the embodiments of the present invention.

FIG. 6 shows the structure of a first server (203) provided in the embodiments of the present invention. As shown in FIG. 6, the first server (203) can comprise a receiving module (2031), used to receive a field data acquisition permission request message from the field data processing apparatus (201), wherein the field data acquisition permission request message is used for the field data processing apparatus (201) to request the right to acquire field data from at least a field apparatus (202) on the industrial site, a processing module (2032), used for the server (203) to determine whether the field data processing apparatus (201) has the right to acquire field data, and a sending module (2033), used to send a field data acquisition permission acknowledgement message to the field apparatus (202) when the processing module (2032) determines that the field data processing apparatus (201) has the right to acquire field data, wherein the field data acquisition permission acknowledgement message is used to indicate that the field data processing apparatus (201) has the right to acquire field data.

Alternatively, the receiving module (2031) is particularly used to receive the field data acquisition permission request message containing the identification of the field data processing apparatus (201) and acquire the identification of the field data processing apparatus (201) from the field data acquisition permission request message, and the sending module (2033) is further used to send a first notification message to at least a field apparatus (202) when the processing module (2032) determines that the field data processing apparatus (201) has the right to acquire field data, wherein the first notification message is used to notify at least a field apparatus (202) that the field data processing apparatus (201) with the identification has the right to acquire field data.

Alternatively, the receiving module (2031) is particularly used to receive the field data acquisition permission request message containing the identification of the field data processing apparatus (201) and acquire the identification of the field data processing apparatus (201) from the field data acquisition permission request message, and the sending module (2033) is further used to send a second notification message to a field control apparatus (204) when the processing module (2032) determines that the field data processing apparatus (201) has the right to acquire field data, wherein the second notification message is used to notify the field control apparatus (204) that the field data processing apparatus (201) with the identification has the right to acquire field data, wherein the field control apparatus (204) is used to control the sending of field data from at least a field apparatus (202).

Alternatively, the sending module (2033) is further used to send a configuration command to the field data processing apparatus (201), wherein the configuration command is used to configure at least a processing function which the field data processing apparatus (201) has to process field data.

For other optional implementation modes of the first server (203), see the realization of the server (203) in the previous embodiments. No details about other optional implementation modes will be given here.

Figure 7:
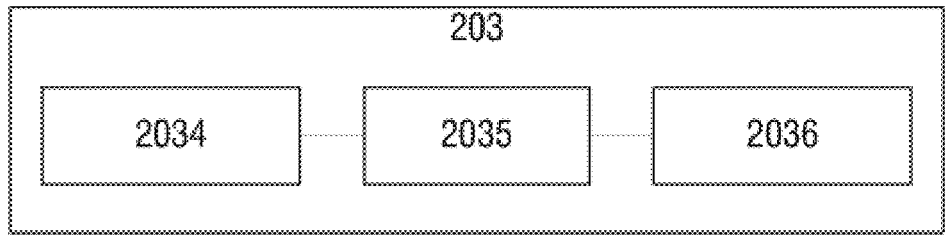
FIG. 7 shows the structure of a second server provided in the embodiments of the present invention.

FIG. 7 shows the structure of a second server (203) provided in the embodiments of the present invention. As shown in FIG. 7, the second server (203) can comprise a receiver (2034), used to receive a field data acquisition permission request message from the field data processing apparatus (201), wherein the field data acquisition permission request message is used for the field data processing apparatus (201) to request the right to acquire field data from at least a field apparatus (202) on the industrial site, a processor (2035), used for the server (203) to determine whether the field data processing apparatus (201) has the right to acquire field data, and a sender (2036), used to send a field data acquisition permission acknowledgement message to the field apparatus (202) when the processor (2035) determines that the field data processing apparatus (201) has the right to acquire field data, wherein the field data acquisition permission acknowledgement message is used to indicate that the field data processing apparatus (201) has the right to acquire field data.

For other optional implementation modes of the second server (203), see the realization of the server (203) in the previous embodiments. No details about other optional implementation modes will be given here.

The second server shown in FIG. 7 can be considered a specific implementation mode of the first server (203) shown in FIG. 6. Wherein, the receiving module (2031), processing module (2032) and sending module (2033) can be program modules and are stored as machine readable instructions in at least a storage, and the processor (2035) invokes these program modules to realize the functions of these program modules.

Figure 8:
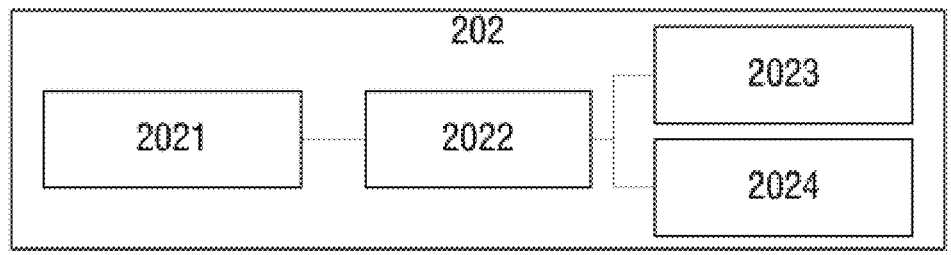
FIG. 8 shows the structure of a first field apparatus provided in the embodiments of the present invention.

FIG. 8 shows the structure of a first field apparatus (202) provided in the embodiments of the present invention. As shown in FIG. 8, the first field apparatus (202) can comprise a first receiving module (2021), used to receive a first notification message from a server (203) located in the central position, wherein the first notification message is used to notify the field apparatus (202) that a field data processing apparatus (201) with an identification on the industrial site has the right to acquire the field data of the field apparatus (202), a processing module (2022), used to determine that the field data processing apparatus (201) with the identification has the right to acquire field data according to the first notification message, a second receiving module (2023), used to receive a first field data acquisition request message from the field data processing apparatus (201) and acquire the identification of the field data processing apparatus (201) from the first field data acquisition request message, the processing module (2022) being further used to determine that the field data processing apparatus (201) has the right to acquire field data according to the identification, and a second sending module (2024), used to send field data to the field data processing apparatus (201).

For other optional implementation modes of the first field apparatus (202), see the realization of the field apparatus (202) in the previous embodiments. No details about other optional implementation modes will be given here.

Figure 9:
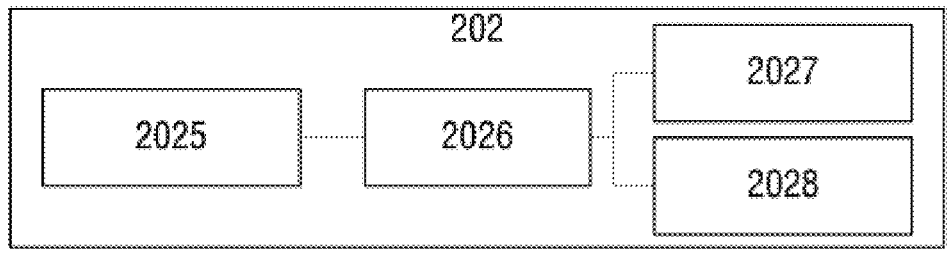
FIG. 9 shows the structure of a second field apparatus provided in the embodiments of the present invention.

FIG. 9 shows the structure of a second field apparatus (202) provided in the embodiments of the present invention. As shown in FIG. 9, the second field apparatus (202) can comprise:

a first receiver (2025), used to receive a first notification message from a server (203) located in the central position, wherein the first notification message is used to notify the field apparatus (202) that a field data processing apparatus (201) with an identification on the industrial site has the right to acquire field data of the field apparatus (202), a processor (2026), used to determine that the field data processing apparatus (201) with the identification has the right to acquire field data according to the first notification message, a second receiver (2027), used to receive a first field data acquisition request message from the field data processing apparatus (201) and acquire the identification of the field data processing apparatus (201) from the first field data acquisition request message, the processor (2026) being further used to determine that the field data processing apparatus (201) has the right to acquire field data according to the identification, and a second sender (2028), used to send field data to the field data processing apparatus (201).

For other optional implementation modes of the second field apparatus (202), see the realization of the field apparatus (202) in the previous embodiments. No details about other optional implementation modes will be given here.

The second field apparatus (202) shown in FIG. 9 can be considered a specific implementation mode of the first field apparatus (202) shown in FIG. 8. Wherein, the first receiving module (2021), processing module (2022), second receiving module (2023) and second sending module (2024) can be program modules and are stored as machine readable instructions in at least a storage, and the processor (2026) invokes these program modules to realize the functions of these program modules.

Figure 10:
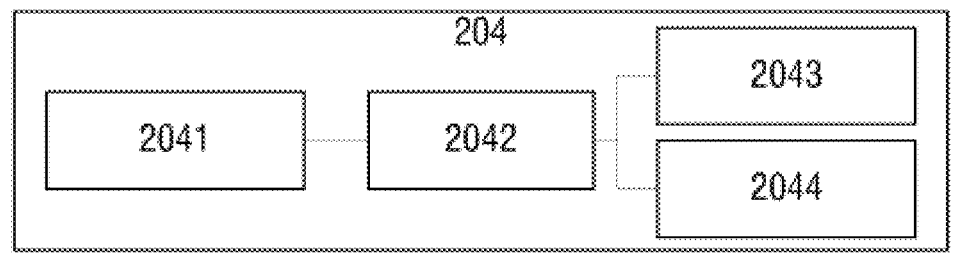
FIG. 10 shows the structure of a first field control apparatus provided in the embodiments of the present invention.

FIG. 10 shows the structure of a first field control apparatus (204) provided in the embodiments of the present invention. As shown in FIG. 10, the first field control apparatus (204) can comprise a first receiving module (2041), used to receive a second notification message from a server (203) located in the central position, wherein the second notification message is used to notify the field control apparatus (204) that a field data processing apparatus (201) with an identification on an industrial site has the right to acquire the field data of at least a field apparatus (202) on the industrial site, a processing module (2042), used to determine that the field data processing apparatus (201) with the identification has the right to acquire field data according to the second notification message, a second receiving module (2043), used to receive a second field data acquisition request message from the field data processing apparatus (201) and acquire the identification of the field data processing apparatus (201) from the second field data acquisition request message, the processing module (2042) being further used to determine that the field data processing apparatus (201) has the right to acquire field data according to the identification, and a second sending module (2044), used to send field data to the field data processing apparatus (201).

For other optional implementation modes of the first field control apparatus (204), see the realization of the field control apparatus (204) in the previous embodiments. No details about other optional implementation modes will be given here.

Figure 11:
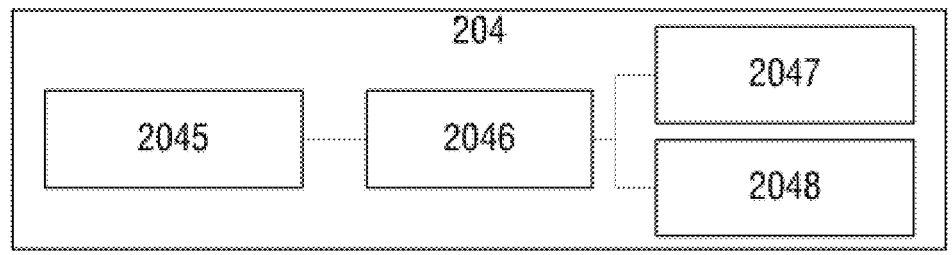
FIG. 11 shows the structure of a second field control apparatus provided in the embodiments of the present invention.

FIG. 11 shows the structure of a second field control apparatus (204) provided in the embodiments of the present invention. As shown in FIG. 11, the second field control apparatus (204) can comprise a first receiver (2045), used to receive a second notification message from a server (203) located in the central position, wherein the second notification message is used to notify the field control apparatus (204) that a field data processing apparatus (201) with an identification on an industrial site has the right to acquire the field data of at least a field apparatus (202) on the industrial site, a processor (2046), used to determine that the field data processing apparatus (201) with the identification has the right to acquire field data according to the second notification message, a second receiver (2047), used to receive a second field data acquisition request message from the field data processing apparatus (201) and acquire the identification of the field data processing apparatus (201) from the second field data acquisition request message, the processor (2046) being further used to determine that the field data processing apparatus (201) has the right to acquire field data according to the identification, and a second sender (2048), used to send field data to the field data processing apparatus (201).

For other optional implementation modes of the second field control apparatus (204), see the realization of the field control apparatus (204) in the previous embodiments. No details about other optional implementation modes will be given here.

The second field control apparatus (204) shown in FIG. 11 can be considered a specific implementation mode of the first field control apparatus (204) shown in FIG. 10. Wherein, the first receiving module (2041), processing module (2042), second receiving module (2043) and second sending module (2044) can be program modules and are stored as machine readable instructions in at least a storage, and the processor (2046) invokes these program modules to realize the functions of these program modules.

The embodiments of the present invention further provide a machine readable medium. A machine readable instruction is stored on the machine readable medium, and when the machine readable instruction is executed by a processor, the processor will execute any method provided in the previous embodiments.

The embodiments of the present invention further provide a machine readable instruction, and when the machine readable instruction is executed by a processor, the processor will execute any method provided in the previous embodiments.

The embodiments of the present invention can further provide a system or device equipped with a storage medium. Machine instructions which can realize the function in any of above-mentioned embodiments are stored in the storage medium and the computer (or CPU or MPU) of the system or device can read and execute the machine instructions stored in the storage medium.

In this case, machine instructions read from the storage medium themselves can realize the function in any of the above-mentioned embodiments. Therefore, machine instructions and the storage medium where machine instructions are stored constitute a part of the present invention.

Embodiments of storage media used to provide machine instructions include floppy disk, hard disk, magneto-optical disk, optical disk (for example, CD-ROM, CD-R, CD-RW, DVD-ROM, DVD-RAM, DVD-RW, DVD+RW), magnetic tape, non-volatile memory card, and read-only memory (ROM). Alternatively, the machine instructions can be downloaded from the server computer over a communication network.

In addition, it should clearly be understood that the function of any of the above-mentioned embodiments can be realized not only by executing the machine instructions read out by a computer, but also by letting the operating system running on the computer complete a part or all of practical operations through a machine instruction based instruction.

In addition, it should be understood that the machine instructions read out of a storage medium are written into the storage in the expansion board in a computer or are written into a storage in an expansion unit connected to the computer, and then the machine instruction based instruction lets the CPU installed on the expansion board or expansion unit execute a part or all of practical operations to realize the function of any of the above-mentioned embodiments.

It should be noted that not all steps or modules in the above-mentioned flowcharts and system structure diagrams are required, and some steps or modules can be omitted, depending on the actual requirements. The execution sequence of the steps is not fixed and can be adjusted as required. The system structures described in the above-mentioned embodiments can be physical structures or logical structures. That is to say, some modules may be realized by a physical entity, or some modules may be realized by a plurality of physical entities or may jointly be realized by some components in a plurality of self-contained devices.

In the above-mentioned embodiments, hardware units can mechanically or electrically be realized. For example, a hardware unit can comprise a permanent dedicated circuit or logic (for example, special processor, FPGA, or ASIC) to complete the corresponding operations. A hardware unit can further comprise a programmable logic or circuit (for example, a general processor or other programmable processor) and can complete the corresponding operations through temporary software setting. The specific implementation mode (mechanical mode, or dedicated permanent circuit, or circuit which is temporarily set) can be determined on the basis of consideration of cost and time.

The present invention is revealed and described in detail above in combination with the drawings and preferred embodiments. However, the present invention is not limited to these disclosed embodiments. On the basis of a plurality of above-mentioned embodiments, those skilled in the art can know that more embodiments of the present invention can be obtained by combining the code review means in the above-mentioned different embodiments, and all these embodiments should also fall within the scope of protection of the present invention.

The invention claimed is:

1. An apparatus control method, usable to control a field data processing apparatus on an industrial site of an industrial system, the apparatus control method comprising:

receiving, at the field data processing apparatus, field data from at least a field apparatus located on the industrial site and generating field data, processing the field data and providing a processing result of the field data to a server or displaying the processing result of the field data on the industrial site; and sending a field data acquisition permission request message to the server to request a right to acquire the field data; and receiving, at the server located in the industrial system and connected with the field data processing apparatus, the field data acquisition permission request message, determining whether the field data processing apparatus has the right to acquire the field data, sending upon the field data processing apparatus being determined to have the right to acquire said field data, a field data acquisition permission acknowledgement message to the field apparatus, the field data acquisition permission acknowledgement message being usable to indicate that the field data processing apparatus has the right to acquire the field data; and receiving, at the field data processing apparatus, the field data acquisition permission acknowledgement message, and determining that the field data processing apparatus has the right to acquire the field data according to the field data acquisition permission acknowledgement.

2. The apparatus control method of claim 1, wherein the receiving of the field data acquisition permission request message includes:
   receiving, via the server, the field data acquisition permission request message containing identification of the field data processing apparatus, and
   acquiring, via the server, the identification of the field data processing apparatus from said field data acquisition permission request message;
   the apparatus control method further comprising:
   sending, via the server, upon the determining indicating that the field data processing apparatus has the right to acquire the field data, a first notification message to at least the field apparatus, the first notification message being usable to notify at least the field apparatus that the field data processing apparatus with the identification has the right to acquire the field data.

3. The apparatus control method of claim 1, wherein the receiving of the field data acquisition permission request message includes:
   receiving, via the server, the field data acquisition permission request message containing identification of the field data processing apparatus, and
   acquiring, via the server, the identification of the field data processing apparatus from said field data acquisition permission request message;
   the apparatus control method further comprising:
   sending via the server, upon the determining indicating that the field data processing apparatus has the right to acquire the field data, a second notification message to a field control apparatus, the second notification message being usable to notify the field control apparatus that the field data processing apparatus with the identification has the right to acquire the field data, wherein the field control apparatus is configured to control the sending of the field data from at least the field apparatus.

4. An industrial system, comprising:
   at least a field apparatus, located on an industrial site of the industrial system;
   a field data processing apparatus, located on the industrial site, the field data processing apparatus being configured to:
      receive field data from at least a field apparatus on the industrial site, process the field data, and
      provide a processing result of the field data; and
   a server, located in the industrial system and connected with the field data processing apparatus;
   the field data processing apparatus being configured to:
      send a field data acquisition permission request message to the server to request a right to acquire the field data; and
   the server being configured to:
      receive the field data acquisition permission request message, and
      determine whether the field data processing apparatus has the right to acquire the field data, and
      send, upon the field data processing apparatus being determined to have the right to acquire said field data, a field data acquisition permission acknowledgement message to the field apparatus, the field data acquisition permission acknowledgement message being usable to indicate that the field data processing apparatus has the right to acquire the field data, and the field data processing apparatus being further configured to:
      receive the field data acquisition permission acknowledgement message,
      determine that the field data processing apparatus has the right to acquire the field data according to the field data acquisition permission acknowledgement message, and
      send processed field data from the field data processing apparatus to the server.

5. A server, the server being configured to control a field data processing apparatus on an industrial site, the server comprising:
   a receiver, to receive a field data acquisition permission request message from the field data processing apparatus on the industrial site, the field data acquisition permission request message being usable for the field data processing apparatus to request a right to acquire field data from at least a field apparatus on the industrial site;
   a processor, to determine whether the field data processing apparatus has the right to acquire the field data;
   a sender, to send upon the field data processing apparatus being determined to have the right to acquire said field data, a field data acquisition permission acknowledgement message to the field apparatus, the field data acquisition permission acknowledgment message being usable to indicate that the field data processing apparatus has the right to acquire the field data; and
   receive processed field data, associated with the field apparatus, from the field data processing apparatus.

* * * * *